Patented Nov. 16, 1926.

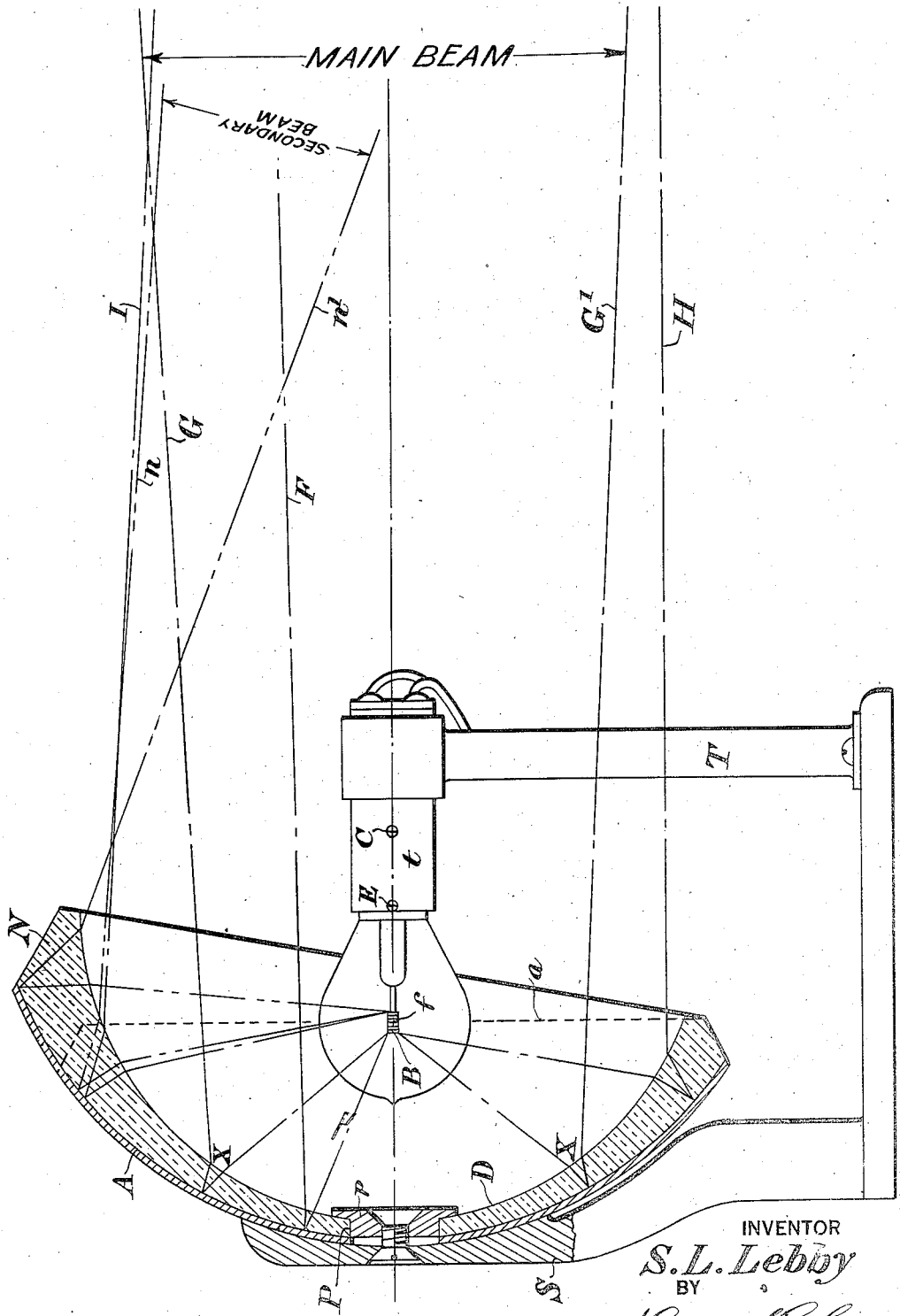

1,607,088

UNITED STATES PATENT OFFICE.

STATES LEE LEBBY, OF CORNING, NEW YORK.

LIGHT PROJECTOR.

Application filed April 17, 1923. Serial No. 632,777.

In another application, Serial No. 632,776, executed by me of even date herewith, I have described a refracting mirror in which light falling on the marginal portion thereof from the focal point (i. e., that point at which a point light source projects the beam of maximum concentration), is projected convergently through the principal axis.

In this application I have proposed to utilize this property for the projection of a secondary beam at a considerable angle to the main axis, and I accomplish this by extending the marginal portions of the mirror shown in my prior application, whereby the converging effect at such portions is increased. This extension is localized to one side of the vertex, so that the secondary beam is projected to one side only of the main beam.

By providing the mirror with suitable means of rotating it in its mounting about its vertex, it is obvious that the direction in which the secondary beam will be projected may be determined at will, and this renders this invention especially applicable to railway signals located adjacent the curves along the track, the arrangement at such point being such that the highly concentrated main beam affords a distant indication, and the secondary beam gives the close-up reading. Or, again, the position of the mirror may be such that on tangents, the main beam will give the distant indication, and the secondary beam, the close-up indication near and below the projector.

In the accompanying drawing, in which the figure represents a vertical sectional view through a projector constructed according to my invention, corresponding parts are designated by corresponding marks of reference.

The mirror is substantially the mirror shown in my aforesaid application, except that the upper part thereof is locally extended as at N, such portion having the property of projecting convergently to the principal axis, rays falling thereon from points adjacent to the focal point $f$. In this instance, such convergence is downwardly, as illustrated by the rays $n—n'$, and across the main beam indicated at G—G'.

The dotted line $a$ indicates the limits of the mirror unextended, the portion N beyond the dotted line, as noted above indicates the extended portion of the mirror. The mirror has a bore P therein at its vertex which forms a bearing to receive a mounting $p$ from a standard S. The filament B is positioned axially of the mirror and is carried in a lamp which is secured on a lamp mounting $t$ carried on a second standard T.

For the purposes of fully disclosing in this invention the construction of the mirror aforesaid, the following, which is stated more fully in my aforesaid application, is here incorporated.

As an example of a mirror embodying my invention, I state that the glass of which the mirror is composed has a refractive index of 1.52; that the silvered rear convex face A has a radius of curvature of 3.4375 inches struck as a sphere from the point C on the principal axis; that the spherical front face D is struck with a radius of curvature of 2.625 inches from the point E also on the principal axis; that the thickness of the mirror at the vertex is .1875 inch; that the focal point is at $f$, giving divergence of 1.5 degrees to the ray from such focal point projected with maximum spread by the mirror, and that with a light source of .125 inches along the axis located symmetrically in respect to the focal point, the beam spread of the main beam is 6 degrees; and that the mirror exclusive of the extended portion thereof subtends an angle of the light source of 180 degrees. It will be noted in the above illustration that the ratio of the radius of the front face to that of the rear face is as 1 is to 1.27 $\left(\text{or } \dfrac{1}{1.27}\right)$.

The light source B is shown as a filament located axially of the projecting system symmetrically about the focal point $f$. This filament is preferably of the type shown in my other application, Ser. No. 612,701, filed January 15, 1923, to which reference is made of certain of the problems herein involved.

With the construction shown, rays from the end of the filament nearest the vertex of the mirror falling on the mirror within a certain restricted zone around the vertex, marked by X—X, increase in divergence as the point of their projection is removed from the vertex, as shown by the rays F and G. Rays from the same point of the light source falling on parts of the mirror exterior to such zone are projected in rays at angles progressively less divergent so that, in my preferred construction, the marginal portions of the mirror project light from such point of the light source in rays substantially parallel with the principal axis, as shown at H.

From the above it follows that rays from the opposite point of the light source are projected by the margin of the mirror convergent with the principal axis. This angle of convergence of the last named rays (see ray I) should not be substantially greater than the angle of divergence of the rays G having the greatest divergence, in order that the first named rays in crossing the principal optical axis of the mirror within the limits of working distance, will not produce a halo around the principal axis and the principal beam on the opposite side of the axis from that on which the point of the mirror from which it was projected was located. This is illustrated by noting that the ray I is substantially parallel with the ray G' illustrated in lower portion of the figure as emanating from the opposite side of the mirror.

From the foregoing it will be observed that rays projected by the extended portion N of the mirror, will increase in convergence as the point of their projection is moved away from the vertex of the mirror, such as $n$ projected from points nearest the inner boundary of N and from the end of the filament furthest from the vertex being the least convergent of the rays projected by the extension of the mirror, into the secondary beam, and the rays such as $n'$ projected by the marginal portions of the extension N from the farthest end of the filament, being the most convergent, and in the position of the mirror indicated, marking the lower boundary of the secondary beam. Thus rays emanating from the light source projected by the extended portion N of the mirror are projected convergent to the axis and combine to form the secondary beam, and this beam is projected with its axis at an angle to the axis of the main beam and produces a beam which gradually departs from the main beam, this departure, in the position of the mirror indicated, being downward.

To increase the angle of convergence of the secondary beam formed by $n$ and $n'$, the filament may be shifted slightly (say $\frac{1}{16}$th of an inch) forward of its asymmetrical position in respect to the focal point $f$, this, of course increasing to a corresponding effect the concentration of the main beam, and decreasing the concentration of the secondary beam. On the other hand the filament may be shifted slightly to the rear of its asymmetrical position in respect to the focal point to obtain a less angle of convergence of the secondary beam. This would decrease the concentration of the main beam and increase the concentration of the secondary beam.

The claims herein are directed only to the mirror having the extended portion, and to the bearing by which the mirror may be shifted around its axis, those matters referred to herein by way of explanation which fall within the disclosures of my said other applications, being claimed therein, or in continuations, divisions, or renewals thereof.

Having thus described my invention what I claim as new and desire to secure by Letters Patent is:—

1. A refracting mirror having a localized extended marginal portion projecting focal rays convergent to the main beam, the mirror being provided with a bearing by which it may be shifted around its principal axis as a center.

2. A light projecting concave refracting mirror comprising a rear portion bounded by the vertex of the mirror and a plane substantially perpendicular to its principal axis, constructed and shaped to project a concentrated main beam of light of convergent and divergent rays from a light source placed at its focus, and a continuous forward portion extending beyond said plane and bounded by a plane oblique to said axis and constructed to project from such light source a secondary beam of light whose axis is inclined to the axis of the main beam; the angle formed between the axis of the main beam and the ray of minimum divergence of the secondary beam being less than the angle between the axis of the main beam and the ray of maximum divergence of the main beam.

In testimony whereof, I hereunto sign my name.

STATES LEE LEBBY.